(12) United States Patent
Kubik et al.

(10) Patent No.: US 9,581,191 B2
(45) Date of Patent: Feb. 28, 2017

(54) ROLLER AND METHODS FOR PRODUCTION AND OPERATION

(75) Inventors: Klaus Kubik, Toenisvorst (DE); Andre Huennekens, Straelen (DE)

(73) Assignee: ANDRITZ KUESTERS GMBH, Krefeld (DE)

( * ) Notice: Subject to any disclaimer, the term of this patent is extended or adjusted under 35 U.S.C. 154(b) by 388 days.

(21) Appl. No.: 14/123,765

(22) PCT Filed: Dec. 9, 2011

(86) PCT No.: PCT/EP2011/072322
§ 371 (c)(1),
(2), (4) Date: Dec. 4, 2013

(87) PCT Pub. No.: WO2012/167849
PCT Pub. Date: Dec. 13, 2012

(65) Prior Publication Data
US 2014/0128232 A1    May 8, 2014

(30) Foreign Application Priority Data

Jun. 6, 2011   (DE) .................. 10 2011 050 860
Aug. 9, 2011   (DE) .................. 10 2011 052 535

(51) Int. Cl.
*F16C 13/02*    (2006.01)
*F16C 13/00*    (2006.01)
*B24B 5/37*     (2006.01)

(52) U.S. Cl.
CPC ............... *F16C 13/00* (2013.01); *B24B 5/37* (2013.01); *F16C 13/024* (2013.01); *Y10T 29/49544* (2015.01)

(58) Field of Classification Search
CPC ........... Y10T 29/49544; Y10T 29/4956; Y10T 29/49561; B21D 3/12; B21D 3/16; B21D 11/10; F16C 13/003; F16C 13/024
See application file for complete search history.

(56) References Cited

U.S. PATENT DOCUMENTS

| | | | |
|---|---|---|---|
| 4,250,606 | A | 2/1981 | Korenaga |
| 4,627,137 | A | 12/1986 | Wildt |
| 4,706,349 | A | 11/1987 | Gallant |
| 4,805,274 | A | 2/1989 | Gallant et al. |
| 6,802,759 | B1 | 10/2004 | Melkert |
| 2002/0069994 | A1 | 6/2002 | Schweinichen et al. |

FOREIGN PATENT DOCUMENTS

| | | |
|---|---|---|
| CN | 1124519 A | 6/1996 |
| CN | 201461724 U | 5/2010 |
| DE | 2 138 289 A | 2/1973 |
| DE | 33 26 281 C1 | 12/1984 |
| DE | 37 00 227 A1 | 7/1988 |
| DE | 198 19 663 A1 | 11/1999 |
| DE | 699 12 162 T2 | 8/2004 |
| DE | 20 2004 016 118 U1 | 2/2006 |
| EP | 0 230 288 A2 | 7/1987 |

(Continued)

*Primary Examiner* — Christopher Besler
(74) *Attorney, Agent, or Firm* — Norman B. Thot (57) ABSTRACT

A method for processing a roll includes providing a roll comprising an axis of rotation, providing at least one pulling device, and bending the roll in a direction opposite to a curvature of the roll via the at least one pulling device. The at least one pulling device is disposed at a radial distance from the axis of rotation of the roll.

6 Claims, 4 Drawing Sheets

(56) References Cited

FOREIGN PATENT DOCUMENTS

| EP | 1 217 123 A1 | 6/2002 |
|---|---|---|
| EP | 1 939 341 A1 | 7/2008 |
| JP | 58-181549 A | 10/1983 |
| JP | 63-283850 | 11/1988 |
| JP | 6-328850 A | 11/1994 |
| WO | WO 2009/113115 A1 | 9/2009 |

ROLLER AND METHODS FOR PRODUCTION AND OPERATION

CROSS REFERENCE TO PRIOR APPLICATIONS

This application is a U.S. National Phase application under 35 U.S.C. §371 of International Application No. PCT/EP2011/072322, filed on Dec. 9, 2011 and which claims benefit to German Patent Application No. 10 2011 050 860.0, filed on Jun. 6, 2011 and to German Patent Application No. 10 2011 052 535.1, filed on Aug. 9, 2011. The International Application was published in German on Dec. 13, 2012 as WO 2012/167849 A1 under PCT Article 21(2).

FIELD

The present invention relates to a method in which a roll having an axis of rotation is bent in the opposite direction of a curvature during production and/or operation. The present invention further relates to such a roll.

BACKGROUND

Such methods and rolls are in the prior art. DE 19819663 A1, for example, describes such a roll. The drawback here is that the roll and the method are complex.

A grinder is described in DE 699 12 162 T2 which has a grinding mechanism and a measuring system that is associated and displaceable with the mechanism. This grinder is provided for grinding an outer surface of a roll, for example, a paper machine roll, and in particular a tissue cylinder or a machine glazing cylinder.

JP 6328850 A describes a grinding method in which a shaft body is ground at its operating temperature so that the concentricity of the shaft body during later operation is improved and its deflection eliminated.

A method for eliminating the radial run-out of a peripherally drilled, heated roll at the operating temperature is described in U.S. Pat. No. 4,250,606. By way of a tie bolt that is inserted into one of the peripheral holes, the roll is given the same curvature at room temperature as that which was previously measured at the operating temperature. At room temperature, the roll is then ground cylindrically so that it assumes a curvature in the opposite direction at room temperature as the curvature which was present previously at the operating temperature after the tie bolt is removed. After subsequent heating to the operating temperature, the roll then has no significant deflection.

EP 1 217 123 A1 describes a paper processing roll which can be exposed to an elevated temperature during operation. For the roll to assume an optimal shape quality and concentric running quality for the process under production conditions in the machines, the roll has a heat-treated surface. For example, it is hot ground and/or hot balanced, or the previously determined profile of the roll in the hot state is subsequently transferred as a negative profile onto the roll by grinding in the cold state, after the roll has cooled.

SUMMARY

An aspect of the present invention is to provide a roll and a method which are improved with regard to the described drawback. An aspect of the present invention is to also provide a method which is suitable for providing an improved engraved rolls for thermobonding.

A method for processing a roll includes providing a roll comprising an axis of rotation, providing at least one pulling device, and bending the roll in a direction opposite to a curvature of the roll via the at least one pulling device. The at least one pulling device is disposed at a radial distance from the axis of rotation of the roll.

BRIEF DESCRIPTION OF THE DRAWINGS

The present invention is described in greater detail below on the basis of embodiments and of the drawings in which.

DETAILED DESCRIPTION

In the method according to the present invention, a roll having an axis of rotation is bent in the opposite direction of a curvature. This is done using at least one pulling device disposed at a radial distance from the axis of rotation.

In an embodiment of the present invention, the method is used, for example to mitigate the radial run-out of a revolving roll, the radial run-out being counteracted by bending of the roll in a direction opposite to the radial run-out in a plane extending through the roll axis.

In an embodiment of the present invention, the roll can thus, for example, be bent in the opposite direction of a curvature that the roll has without the pulling device.

In an embodiment of the present invention, the curvature denotes, for example, the deviation of the roll from a cylindrical shape. The pulling device can, for example, run parallel to the roll axis.

In an embodiment of the present invention, the pulling device can, for example, comprise an axial pulling means, which may comprise a tie bolt. This may be a tie rod having threads at the ends, or clamps or straightening bolts.

In an embodiment of the present invention, the rolls generally bend or curve in a banana shape or in a simple curvature, i.e., only in one bending radius. Such deformations result, for example, from the non-homogeneity of the roll blank. The reasons therefor may be a poor base material, an insufficient forging reduction ratio, as well as inadequate heat treatment during tempering, annealing and hardening. The roll can, for example, be bent in the opposite direction of a curvature with only one bending radius.

In an embodiment, the present invention provides a grinding treatment method of engraved rolls, which have flat-top areas protruding radially from the relief base, wherein the engraved roll is rotated about the axis of rotation thereof, and the flat-top areas of the engraved rolls undergo a grinding operation using a grinding tool.

In an embodiment of the present invention, engraved rolls for thermobonding non-woven fabrics generally have a surface made of truncated cones or truncated pyramids, i.e., three-dimensional structures, the cross-sections of which increase in the radial direction of the roll relative to the relief base.

In an embodiment of the present invention, with thermobonding, a non-woven fabric layer comprising still unbonded filaments comprising thermoplastic material is fed to a nip, which is formed between an engraved roll and a counter roll having a smooth surface. Both the engraved roll and the counter roll are typically heated, wherein the heating power of the engraved roll is selected so that the contact of the flat-top areas with the filaments results in fusion thereof in the region where they rest against the flat-top areas.

In an embodiment of the present invention, the surface of the flat-top areas must be as smooth as possible to prevent the filaments from sticking to the flat-top areas during the fusion process, which would result in destruction of the non-woven fabric layer or in dangerous looping around the roll in which the non-woven fabric layer is wound around the engraved roll and the nip is blocked as a result of the rapid increase in circumference of the roll. Engraved rolls therefore undergo a grinding operation as "raw rolls" after the engraving has been produced.

For this purpose, for example, the raw rolls are generally mounted rotatably at roll shoulders adjoining the engraved region in the longitudinal direction of the rolls and are rotatably driven about the rotational axes thereof. The grinding operation is carried out using a grinding tool which is longitudinally guided over the roll parallel to the axis of rotation, so that all flat-top areas of the engraving are subjected to a grinding treatment. The grinding tool may be a grindstone which itself rotates about an axis of rotation extending parallel to the axis of rotation of the engraved roll.

Figure 1:
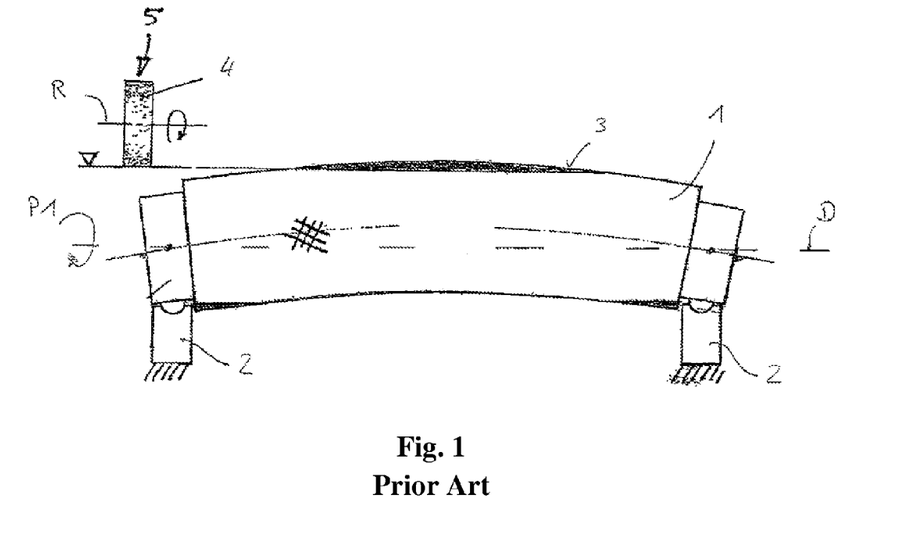
FIG. 1 shows a grinding treatment method according to the prior art.

In many cases, the roll body of the raw roll has a curvature after the manufacturing process which is typically the most pronounced approximately at the center between the face-side ends. The radial run-out caused by the curvature, which is considered undesirable for the thermobonding process, is eliminated at least for the most part by the grinding operation—as can be seen in FIG. 1, which schematically illustrates the effect of a grinding treatment method according to the prior art. The engraved structures are here ground down to varying degrees so that flat-top areas having differing sizes result from the increasing cross-sections thereof toward the relief bases. These differences in flat-top areas result in a non-woven fabric (having been bonded by a thermobonding method using such an engraved roll) which has bond point areas that change periodically in the feed direction of the non-woven web, resulting at a minimum in an adverse effect on the optical impression that is conveyed by this non-woven web and even in significant worsening of the web's properties.

In an embodiment, the present invention provides that, during the grinding treatment method, the grinding tool is guided at least approximately along the lateral face of the engraved roll formed by the envelopes of the flat-top areas. As a result, a radial run-out present due to a roll curvature is no longer "eliminated by grinding", as is the case in the prior art The grinding operation can, for example, be carried out in a way in which the radial run-out during operation of the roll is tolerated for the benefit of a flat-top area size being constant over the entire engraved roll.

The pulling devices can thus, for example, be removed again, or the load relieved from the pulling devices, prior to operation, or the roll not straightened entirely or not with maximum precision.

It has surprisingly been found that, despite the radial run-out now being present on the engraved roll all the time during operation, a thermobonding method, together with a smooth counter roll, can result in bonded non-woven webs having both optically and mechanically improved properties.

In order to guide the grinding tool at least approximately along the lateral face of the engraved roll formed by the envelopes of the flat-top areas, an embodiment of the present invention provides that the engraved roll can be pretensioned or bent before the grinding operation so that the envelope of the engraved roll at least approximately has the shape of a cylinder.

In an embodiment of the present invention, the roll is thus bent so far or with such high precision in the opposite direction of the curvature until the roll is at least approximately straight.

In an embodiment of the present invention, the grinding tool is then displaced parallel to the axis of rotation of the engraved roll, and the flat-top areas are ground to the same size within the threshold of the tolerance resulting from the remaining radial run-out.

In an embodiment of the present invention, the pretension is introduced with the aid of a pulling device disposed at a radial distance from the axis of rotation. Such a pulling device can be advantageous when the engraved roll already has peripheral longitudinal holes, which is to say longitudinal holes provided at a distance from the axis of rotation, and in particular those longitudinal holes that primarily serve temperature control purposes. The pulling device can then, for example, be introduced into the peripheral hole, which extends as closely as possible along the largest concave curvature of the engraved roll. The tensile force exerted by the pulling device can then, for example, be selected so that the curvature of the roll is at least substantially eliminated. If necessary, it is also possible to use multiple pulling devices in various peripheral holes.

In an embodiment of the present invention, the engraved roll may also be pretensioned by targeted temperature control that is not uniform over the length and/or the cross-section of the roll. This non-uniform temperature control can, in principle, be achieved in any arbitrary, technologically feasible manner. If the engraved roll is again one that has peripheral holes, the temperature can, for example, be controlled by temperature control means, for example, via heating elements such as heating rods, disposed in the peripheral holes of the roll.

If the engraved roll has a central longitudinal hole, pretension can also be generated by way of a bending device disposed in the central hole of the engraved roll. This may be a bending device which is described, for example, in DE 198 19 663 A1.

In the above-described embodiments of the grinding method, the grinding tool is guided at least approximately along the lateral face of the engraved roll formed by the envelopes of the flat-top areas in particular in that the engraved roll is brought at least approximately into a cylindrical shape prior to the grinding operation.

In an embodiment of the grinding method according to the present invention, no targeted tension is applied to the raw roll to compensate for the curvature. The radial run-outs of the envelopes are instead measured prior to the grinding operation, the measured values being stored in a spatially resolved manner relative to the envelope, and the grinding tool, with the aid of the stored measured values, being moved during the grinding operation so that it at least substantially follows the envelope. This embodiment of the method according to the present invention also allows, for example, those raw rolls to also be advantageously processed, within the meaning of a largely constant flat-top size, which not only have a simple curvature, but also those which have an "S curvature", for example, or a "double run-out" situation.

It is generally desirable to record the measuring values of the envelopes in as narrow a grid as possible so as to improve the accuracy of the grinding treatment method. In practice, it will suffice in most instances if measuring values of the distance of the envelope from the axis of rotation of the engraved roll in the longitudinal roll direction are recorded and stored approximately every 5 cm to 20 cm, and in the direction of rotation, at an angular distance of approximately 5° to 20°.

In an embodiment, the present invention also provides an engraved roll, such a roll intended for thermobonding non-woven fabrics and which has been processed using a grinding treatment method of the type described above.

In an embodiment, the present invention further provides a method for producing engravings on engraved rolls which have flat-top areas protruding radially from the relief base, in which the engraved roll is rotated about the axis of rotation thereof, and the engraving is generated in multiple engraving operations.

Engraved rolls for thermobonding non-woven fabrics generally have a surface made of truncated cones or truncated pyramids, i.e., three-dimensional structures, the cross-sections of which increase in the radial direction of the roll relative to the relief base.

With thermobonding, a non-woven fabric layer comprising still unbonded filaments comprising thermoplastic material is fed to a nip, which is formed between an engraved roll and a counter roll having a smooth surface. Both the engraved roll and the counter roll are typically heated, wherein the heating power of the engraved roll is selected so that the contact of the flat-top areas with the filaments results in fusion of the same in the region where they rest against the flat-top areas.

The surface of the flat-top areas must be as smooth as possible to prevent the filaments from sticking to the flat-top areas during the fusion process, which would result in destruction of the non-woven fabric layer, or even in dangerous looping around the roll, in which the non-woven fabric layer is wound around the engraved roll and the nip is blocked as a result of the rapid increase in circumference of the roll. Engraved rolls are thus subjected to grinding processes during and after production of the engraving, which processes are also intended to assure as exact a cylindrical shape as possible and as exact a concentricity as possible.

The engraving can, for example, be produced mechanically by using a raised pattern cylinder, thermally by using a laser, or also chemically by way of etching using acid, wherein the flat-top areas are covered in advance with paint, or also by way of grinding or milling. It is also possible to employ multiple of the above methods in consecutive engraving operations during the production of the engraving.

A typical method for producing engravings on engraved rolls, for example, comprises the following steps:

A roll, previously ground as precisely to a cylindrical shape as possible, is coated with paint.

Using a laser, paint is then removed by burning in accordance with the specifications and the pattern repeat in those areas where material ablation is to take place.

By way of etching in an acid bath, the roll surface is provided with appropriate recesses in areas where previously the paint was removed by burning.

A first raised pattern cylinder, which is matched to the maximum diameter of the roll, is pressed on and rolled over the surface of the roll. The raised pattern cylinder is in positive engagement for this purpose with the now existing recesses that were incorporated by way of etching in the acid bath.

The engraved pattern continues to form on the roll by squeezing and compression. Paint is ultimately still located essentially only on the flat-top areas of the engraving.

If necessary, the roll is subjected to a further etching treatment in the acid bath. If necessary, the paint layer on the flat-top areas must be replaced beforehand.

If a further mechanical processing step of the roll using a raised pattern cylinder is required, a second raised pattern cylinder, which has been adapted to the changed repeat, is again rolled over the surface of the roll. According to the present invention, up to three different raised pattern cylinders are required depending on the engraving depth and design so that the positions of the flat-top areas are only minimally displaced.

Protruding burrs result on the flat-top areas of the engraving, for example, due to the squeezing of the roll material during treatment with the raised pattern cylinder. These burrs must be removed in a measuring grinding step so as to be able to precisely record the flat-top areas and the engraving depth metrologically.

The progress of the engraving process must always be measured, even when using a method for producing engravings in which more material is ablated thermally, for example, with a laser, or mechanically by grinding or milling. This requires the above-mentioned measuring grinding step of the roll, which can only be performed on an at least substantially cylindrical roll.

In practice, this poses a considerable problem because, during engraving, the roll curves due to strain hardening of the roll material and/or due to disturbances in the overall stresses. The roll must therefore always be straightened again between the engraving steps, which is done thermally by local heating in the described methods.

For this purpose, certain flame points, which were previously localized by estimation, are generally heated using a gas flame, wherein the heat input is likewise estimated based on empirical values. This thermal straightening method is very complex and time-intensive. It requires repeated waiting until the roll body has again cooled down to room temperature so that it can be checked whether the thermal local treatment has resulted in the desired alignment of the roll. Because of the omnipresent uncertainty of success, the engraving process is virtually incalculable.

It is therefore also an aspect of the present invention to provide an improved method for producing engravings on engraved rolls, for example, for thermobonding.

In an embodiment of the method for producing engravings on engraved rolls of the present invention, the roll is at least substantially ground to a cylindrical shape in a first grinding operation, prior to the first engraving operation. In a further step, after the first grinding operation, the roll is subjected at least to the first or further engraving operation. This may, for example, be a thermal or chemical engraving operation of the type described above, or also any arbitrary other or also different, consecutively carried out engraving operations. So as to record the engraving progress, the flat-top areas and the engraving depths must be measured, for which purpose (as was described above) a measuring grinding step must first be carried out using a grinding tool. Because the roll has generally become bent due to the strain hardening or disturbance in the overall stresses, the method according to the present invention in this embodiment provides for the grinding tool to be guided during the measuring grinding step at least approximately along the envelope formed by the flat-top areas.

In an embodiment of the present invention, this is done in a way in which the radial run-out during operation of the roll is tolerated for the benefit of a flat-top area size being constant over the entire engraved roll. The pulling devices can thus, for example, be removed again, or the load relieved from the pulling devices, prior to operation, or the roll not straightened entirely or not with maximum precision. It has surprisingly been found that, despite the radial run-out now being present on the engraved roll all the time during operation, a thermobonding method, together with a smooth counter roll, can result in bonded non-woven webs having both optically and mechanically improved properties.

To be able to guide the grinding tool at least approximately along the envelope of the engraved roll, a further embodiment provides that the engraved roll can be pretensioned before the grinding operation so that the envelope thereof at least approximately has the shape of a cylinder. The roll is thus bent so far or with maximum precision in the opposite direction of the curvature until the roll is at least approximately straight. The grinding tool is then moved parallel to the axis of rotation of the engraved roll.

In an embodiment of the present invention, the pretension is introduced with the aid of a pulling device disposed at a radial distance from the axis of rotation. Such a pulling device may also be used, for example, when the engraved roll already has peripheral longitudinal holes, i.e., longitudinal holes that are provided at a distance from the axis of rotation, for example, those that primarily serve temperature control purposes. The pulling device can then, for example, be introduced into the peripheral hole which extends as closely as possible along the largest concave curvature of the engraved roll. The tensile force exerted by the pulling device can then, for example, be selected so that the curvature of the roll is at least substantially eliminated. If necessary, it is also possible to use multiple pulling devices in various peripheral holes.

In an embodiment of the present invention, it is also possible to leave the pulling devices in the holes if they do not impede further treatment or use of the engraved roll so as to be able to straighten the engraved roll, if necessary, after further treatment steps or use. In this case, final thermal straightening, which otherwise is generally required, may be dispensed with. This final thermal straightening is otherwise generally required because the roll usually bends after the tie bolt is removed.

If the engraved roll has a central longitudinal hole, pretension can also be generated by way of a bending device disposed in the central hole of the engraved roll. This may be a bending device, for example, such as is described in DE 198 19 663 A1.

In the above-described embodiments of the engraving method, the grinding tool is guided at least approximately along the lateral face of the engraved roll, so that the engraved roll is brought, for example, at least approximately into a cylindrical shape prior to the grinding operation.

In an embodiment of the method according to the present invention, no targeted tension is applied to the engraved roll to compensate for the curvature. The radial run-outs of the envelope are instead measured prior to or during grinding, the measured values being stored in a spatially resolved manner relative to the envelope, and the grinding tool, with the aid of the stored measured values, being moved during the grinding operation so that it at least substantially follows the lateral face. This embodiment of the method according to the present invention also allows, for example, those engraved rolls to be advantageously processed, within the meaning of a largely constant flat-top size, which not only have a simple curvature, but also those which have an "S curvature", for example, or a "double run-out" situation. The engraved roll can also basically be pretensioned and measured so as to further improve the grinding precision.

It is in general desirable to record the measuring values of the lateral face in as narrow a grid as possible to improve the accuracy of the engraving method. It will in practice suffice in most instances if measuring values of the distance of the lateral face from the axis of rotation of the engraved roll in the longitudinal roll direction are recorded and stored approximately every 5 cm to 20 cm, and in the direction of rotation at an angular distance of approximately 5° to 20°.

In an embodiment, the present invention also covers an engraved roll, for example, a roll which is provided for thermobonding non-woven fabrics and which has been processed using an engraving method as described above.

Even if the roll is heated in a calender, for example, form errors may develop which are caused by temperature loading, regardless of whether the roll is engraved or smooth.

In an embodiment of the method according to the present invention, the roll is bent in the opposite direction of a curvature that results at least also from the operation of the roll, for example, due to heating (or cooling). In this way, good concentricity of the roll under working conditions is achieved. The curvature thus results, for example, at least also from the heating (or cooling) associated with operation. This heating (or cooling) can be caused by external influences, or the roll may be temperature-controlled, for example, heated.

In an embodiment of the present invention, the concentricity of the roll can, for example, be measured during operation of the roll, i.e., under working conditions, and the at least one pulling device, or the at least one tie bolt, is readjusted until a true running is achieved to as great an extent as possible.

In an embodiment of the present invention, the concentricity can, for example, be measured with a dial gauge.

In an embodiment of the present invention, the measurement can, for example, be carried out using a dial gauge that displays the concentricity of the roll during the operation in the calender.

In an embodiment of the present invention, the measurement can, for example, be carried out at the operating temperature. The operating temperature may be increased by external circumstances or heating, or lowered by cooling.

In an embodiment of the present invention, the at least one pulling device, or the anchor bolts, can be tightened in the calender so that a flawless concentricity is provided. This process may be repeated.

The roll can be measured at its center in the calender with regard to the radial run-out and then be re-tensioned using the pulling devices so that the eccentricity of the roll at the center is no longer present.

In an embodiment, the present invention also provides a roll having at least one pulling device disposed at a radial distance from the roll axis, the pulling device bending the roll in the opposite direction of a curvature, for example, during operation or during operation of the roll. This may be a smooth or engraved roll. The pulling device can, for example, run parallel to the roll axis and can, for example, include tie bolts or clamps. The pulling device can, for example, remain in the roll at all times, which is to say also during operation.

In an embodiment of the present invention, the roll can be at least almost cylindrical. In this embodiment, the pulling devices thus bend the roll so far or with such high precision in the opposite direction of a curvature until the roll is at least approximately straight.

In an embodiment of the present invention, the roll has peripheral holes for temperature control purposes and additionally at least one hole. This at least one additional hole can, for example, be not used for temperature control purposes. It can, for example, run parallel to the roll axis and be spaced therefrom. This additional hole can, for example, be used exclusively to permanently accommodate the pulling device. The pulling device can thus, for example, run in this additional hole.

In an embodiment of the present invention, the at least one additional hole can, for example, run between the hole circle of the peripheral holes for temperature control purposes and the center of the roll or of the roll axis.

In an embodiment of the present invention, thermal oil can, for example, flow in the peripheral holes for temperature control purposes. In an embodiment, the at least one additional hole does not intersect the peripheral holes. In this way, no leakage problem arises.

In an embodiment of the present invention, the roll has peripheral holes for temperature control purposes, and the at least one pulling device runs in such a peripheral hole. This eliminates the need for an additional hole. The roll here does not, for example, have an additional hole for accommodating the pulling device. In this embodiment, the at least one pulling device is located in a peripheral hole, which also serves temperature control purposes, which can, for example, form an annular space. The diameter of this peripheral hole and the diameter of the pulling device can, for example, be matched to each other so that a sufficiently large free cross-sectional surface remains for the thermal oil.

In an embodiment of the present invention, each peripheral hole that accommodates a pulling device and also serves temperature control purposes can, for example, be sealed. It is conceivable to achieve a sealing with the aid of the tensile force brought about by the pulling device.

The pulling device can, for example, be fixed appropriately in the hole.

As FIG. 1 illustrates, a raw engraved roll 1 which is curved after production is rotatably mounted in a bearing device 2 for the purpose of grinding, and is rotatably driven in the direction of the arrow P1 about the axis of rotation D by drive means, which are not shown in the drawing. The curvature of the engraved roll 1 in relation to the axis of rotation D is shown in exaggerated form in FIGS. 1 and 2 for the sake of illustration.

According to a grinding treatment method, which forms part of the related art, the surface of the initially likewise curved envelope 3 is ground using a grinding tool 4, which includes a grindstone 5 rotating about a rotational axis R, which is parallel to the axis of rotation D, by displacing the stone parallel to the axis of rotation D, wherein the regions of the engraved roll 1 shown as black areas in FIG. 1 are removed by grinding. Because of the curvature of the roll 1 and the radial run-out associated therewith, the engraved structures 6 (see FIG. 3), which each have the shape of a truncated cone increasing toward the relief base 8 having the cone angle 2α, are ground to varying degrees in the region shown at the top center in FIG. 1. After the grinding operation, the engraved structures ground only by the length X1 have a surface A1, while those ground by the amount X2 have a larger surface A2.

The same applies analogously to the engraved structures shown as black areas at the bottom of FIG. 1.

Figure 2:
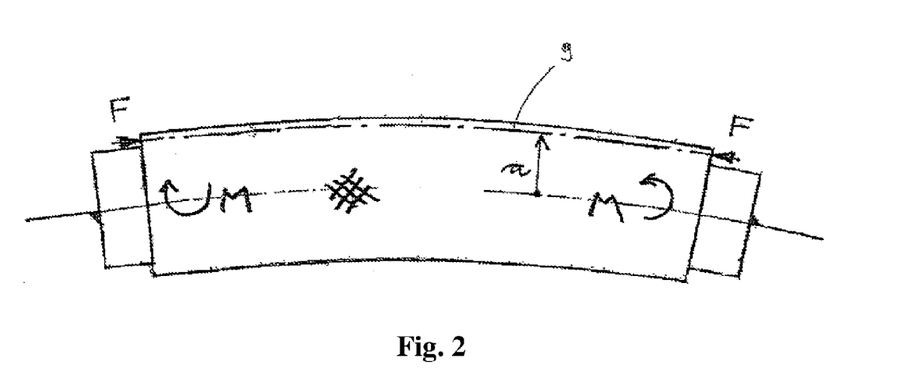
FIG. 2 shows an engraved roll having a pulling device disposed at a radial distance from the axis of rotation for bringing about a pretensioning in an embodiment of the present invention.

So as to prevent these different grinding levels of the engraved structures, a pulling element 9 is inserted into a peripheral hole, which is only hinted at, on the concave side in the engraved roll jacket shown in FIG. 2, the pulling element being used to exert a tensile stress F-F at a distance a from the roll center which applies a bending moment symbolized by the arrows M onto the roll jacket, this bending moment being in accordance with a straight direction of the curved roll jacket.

Figure 3:
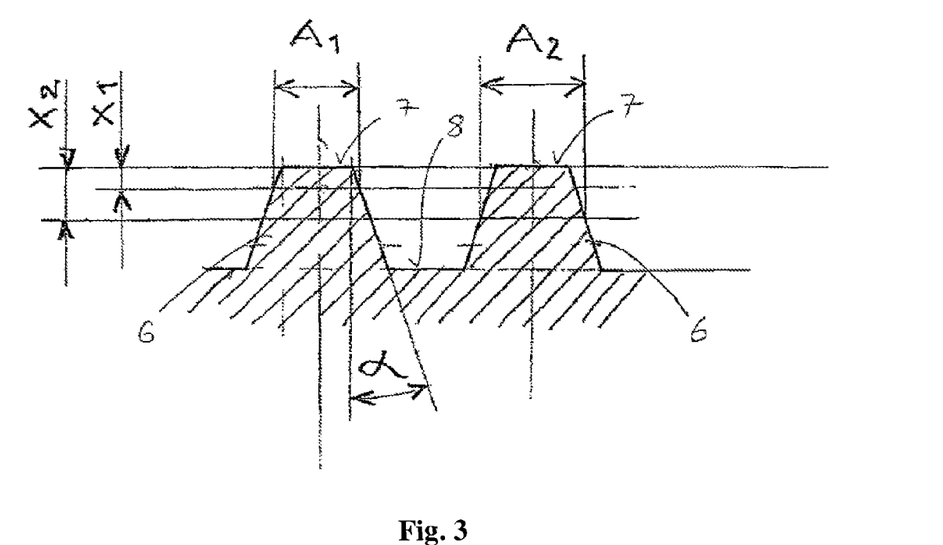
FIG. 3 shows a sectional cut-out view of two engraving structures in an embodiment of the present invention.

As can be seen directly from FIGS. 1 to 3, a reduction in the roll curvature during the grinding method results in the production of more uniform engraved surfaces of the engraved structures, because these are ground to lesser varying degrees.

Figure 4:
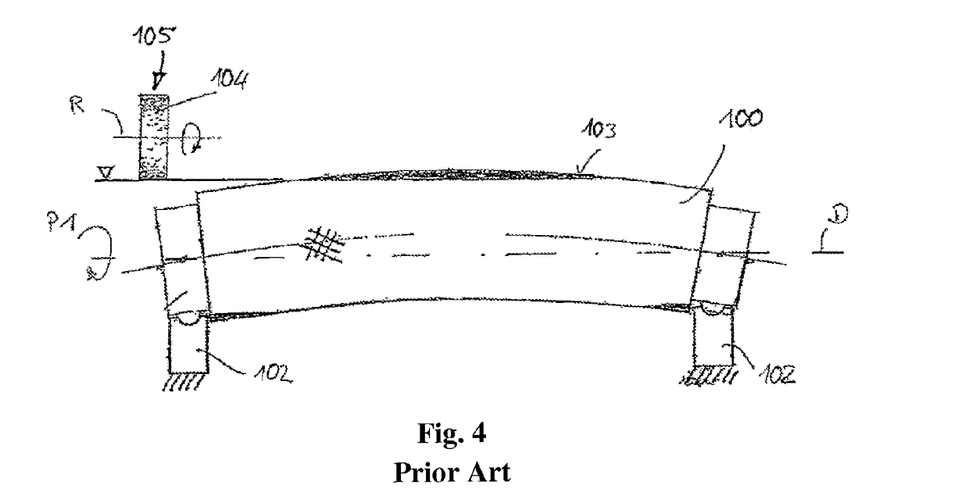
FIG. 4 shows an embodiment of an engraving method according to the prior art.

FIG. 4 illustrates with respect to a second exemplary embodiment of the present invention how an engraved roll 100 which is curved after an engraving operation is rotatably mounted in a bearing device 102 for the purpose of grinding, and is rotatably driven in the direction of the arrow P1 about the axis of rotation D by drive means, which are not shown in the drawing. The curvature of the engraved roll 100 in relation to the axis of rotation D is shown in exaggerated form in FIGS. 4 and 5 for the sake of illustration.

If the likewise curved envelope 103 were now ground using a grinding tool 104, which includes a grinding wheel 105 rotating about a rotational axis R, which extends parallel to the axis of rotation D, by displacing the wheel parallel to the axis of rotation D, the regions of the engraved roll 100 shown as black areas in FIG. 1 would be ground more than the others. Because of the curvature of the roll 100 and the radial run-out associated therewith, the engraved structures 106 (see FIG. 6), which each have the shape of a truncated cone increasing toward the relief base 108, would have greater flat-top areas and a lower engraving depth than in the other regions in the region shown at the top center in FIG. 4.

The same applies analogously to the engraved structures shown as black areas at the bottom of FIG. 4.

Figure 5:
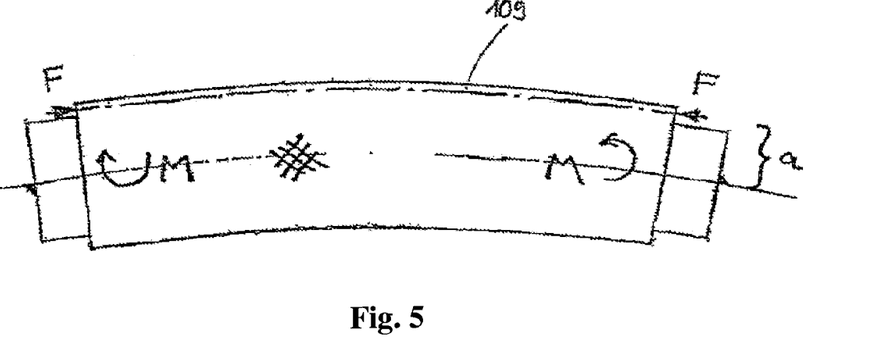
FIG. 5 shows an engraved roll having a pulling device disposed at a radial distance from the axis of rotation for bringing about a pretensioning in an embodiment of the present invention.

So as to prevent these different depths of the engraved structures, a pulling element 109 is inserted into a peripheral hole, which is only indicated, on the concave side of the engraved roll jacket shown in FIG. 5, the pulling element being used to exert a tensile stress F-F at a distance a from the roll center which applies a bending moment symbolized by the arrows M onto the roll jacket, this bending moment being in accordance with a straight direction of the curved roll jacket.

Figure 6:
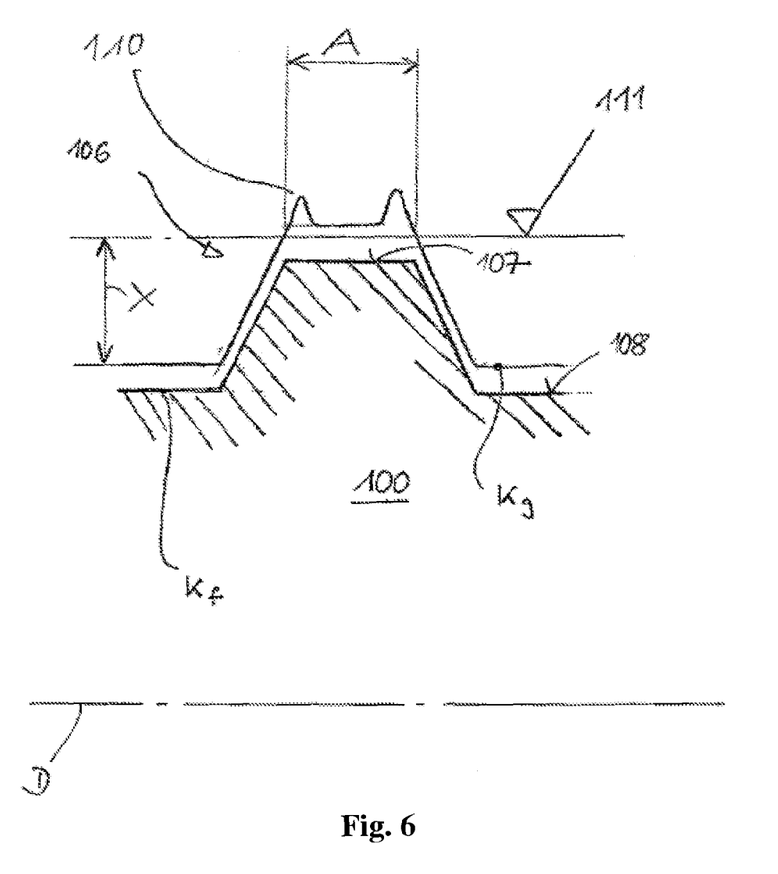
FIG. 6 shows a sectional cut-out view of the contour of an engraved structure during engraving and in the final state in an embodiment of the present invention.

As is shown schematically in FIG. 6, measuring grinding operations are required between engraving steps because neither the surfaces A of the flat-top areas 107 nor the depths X of the engraving can be measured with the necessary precision due to the burrs 110 forming at the edges of the flat-top areas 107 during engraving. In FIG. 6, reference numeral 111 denotes a grinding operation, Kg denotes the contour during engraving, and Kf denotes the contour of the finished contour.

Figure 7:
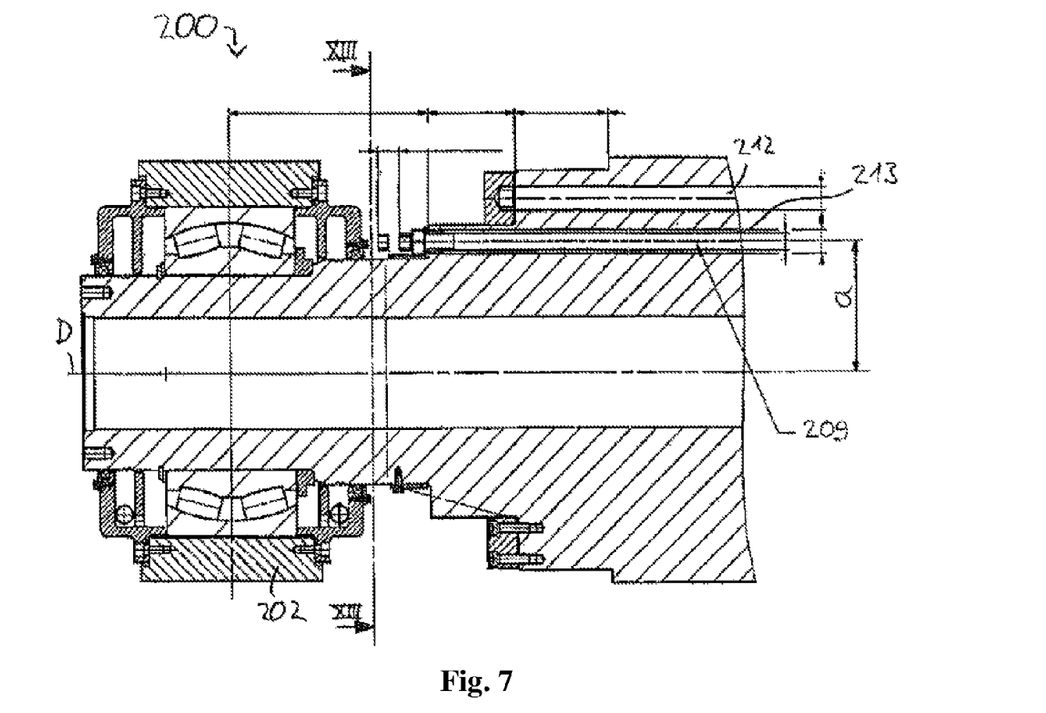
FIG. 7 shows a cross-sectional illustration of an end of a roll in an embodiment of the present invention.
Figure 8:
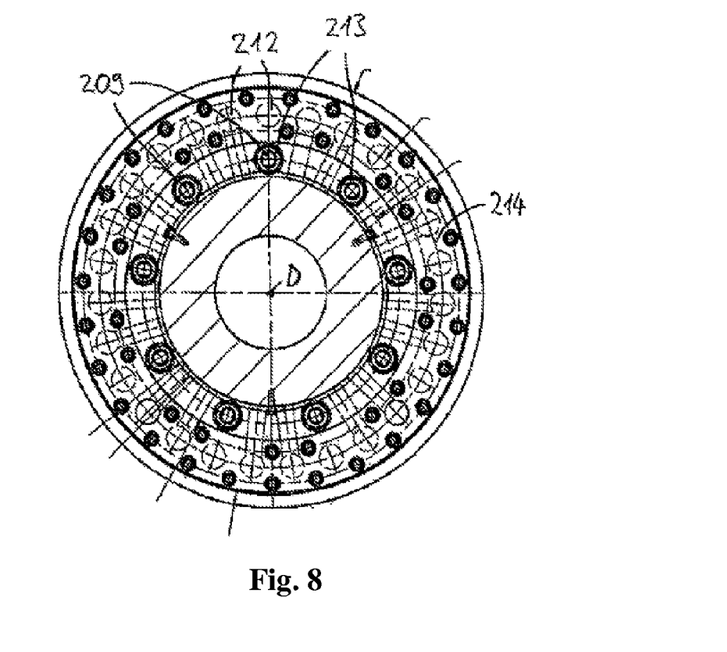
FIG. 8 shows a cross-sectional illustration of the roll of FIG. 7 along the intersecting lines VIII-VIII.

FIGS. 7 and 8 show a third exemplary embodiment of the present invention. As in the exemplary embodiments described above, the roll 200 has multiple pulling devices 209 which extend parallel to and at some distance from the roll axis and which are formed by tie bolts. As can be seen in FIG. 7, the tie bolt is formed by a tie bar having an external thread at the end, onto which a nut is screwed. The right end of the roll 200, which is not illustrated, can be designed accordingly.

The roll 200 is heated. It has peripheral holes 212, which are used for temperature control purposes and can be filled with thermal oil. The roll moreover has additional holes 213, which extend parallel to the peripheral holes 212 for temperature control purposes and within the hole circle 214 formed by them. The tie bolts extend in these additional holes 213. They also remain in the roll during operation of the roll 200. Consequently, it is also possible to compensate for distortions resulting from heating due to the operation of the roll. In other words, form errors that are caused by temperature loading and/or other influences such as a poor base material, insufficient forging reduction ratio as well as inadequate heat treatment during tempering, annealing, hardening and the like, are corrected. The roll 200 can be engraved or smooth.

The roll 200 therefore comprises pulling devices 209 which include axial pulling means. These bend the roll 200 in the opposite direction of a curvature that exists without the pulling means.

The axis of rotation D of the roll 200 and the roll axis of the roll 200 at least substantially coincide in the exemplary embodiment shown in FIGS. 7 and 8 because the roll 200 is bent in the opposite direction of a curvature so far or with such high precision that it is cylindrical.

The pulling device 9, 109, 209 can be made of 42CrMo4v steel and have a diameter of 10 mm to 30 mm, for example, approximately 22 mm (M22). The additional holes 213 can have diameters from 20 mm to 40 mm, for example, approximately 32 mm. As is shown in FIG. 8, the roll 200 has nine additional holes 213, in each of which a pulling device 209 is disposed, and 27 peripheral holes 212 for temperature control purposes.

In all the example measurements shown, the roll 1, 100, 200 is bent in an opposite direction to a curvature of the roll that is stationary relative to the roll. The pulling devices 9, 109, 209 bring about static forces. These are therefore not rolls having deflection that can be controlled, which can be influenced in a direction opposite to bending that is caused by the line load of the nip and is peripheral relative to the roll.

The present invention is not limited to embodiments described herein; reference should be had to the appended claims.

LIST OF REFERENCE NUMERALS 1, 100, 200 roll
2, 102, 202 bearing device
3, 103 envelope
4, 104 grinding tool
5, 105 grinding wheel or grindstone
6, 106 engraved structures
7, 107 flat-top areas
8, 108 relief base
9, 109, 209 pulling element
110 burr
111 grinding operation
212 peripheral holes
213 additional holes
214 hole circle
a distance
A surfaces
D axis of rotation
F-F tensile stress
Kg contour during engraving
Kf contour of finished engraving
M arrow
P1 arrow
R rotational axis
X depths
X1, X2 lengths
α angle

What is claimed is:

1. A method for processing a roll, the method comprising:
providing a roll comprising an axis of rotation, the roll being an engraved roll which is produced by producing engravings comprising flat-top areas protruding radially from a relief base on the engraved roll;
providing at least one pulling device;
bending the roll in a direction opposite to a curvature of the roll via the at least one pulling device, the at least one pulling device being disposed at a radial distance from the axis of rotation of the roll;
providing a grinding tool;
rotating the engraved roll about the axis of rotation; and
while the at least one pulling device is bending the roll, grinding the flat-top areas of the engraved roll via the grinding tool, the grinding tool being guided at least approximately along a lateral face of the engraved roll formed by an envelope of the flat-top areas.

2. The method as recited in claim 1, further comprising:
pretensioning the engraved roll prior to the grinding so that the envelope is at least approximately formed in a cylindrical shape; and
displacing the grinding tool parallel to the axis of rotation of the engraved roll.

3. The method as recited in claim 1, further comprising, prior to the grinding step:
rotating the roll about the axis of rotation;
grinding the roll at least substantially cylindrically in a pre-grinding step; and
engraving the roll in a plurality of steps by producing engravings having flat-top areas protruding radially from a relief base on the roll, thereby producing the engraved roll.

4. The method as recited in claim 3, further comprising:
pretensioning the roll prior to the engraving so that the envelope is at least approximately formed in a cylindrical shape; and
displacing the grinding tool parallel to the axis of rotation of the engraved roll.

5. The method as recited in claim 1, wherein the engraved roll further comprises at least one peripheral hole, and wherein the at least one pulling device comprises at least one tie bolt disposed in the at least one peripheral hole.

6. The method as recited in claim 5, wherein the at least one tie bolt is configured to remain in the at least one peripheral hole.

* * * * *